Oct. 6, 1953 J. B. ATWOOD 2,654,801
FREQUENCY SHIFT RECEIVER
Filed Oct. 20, 1951
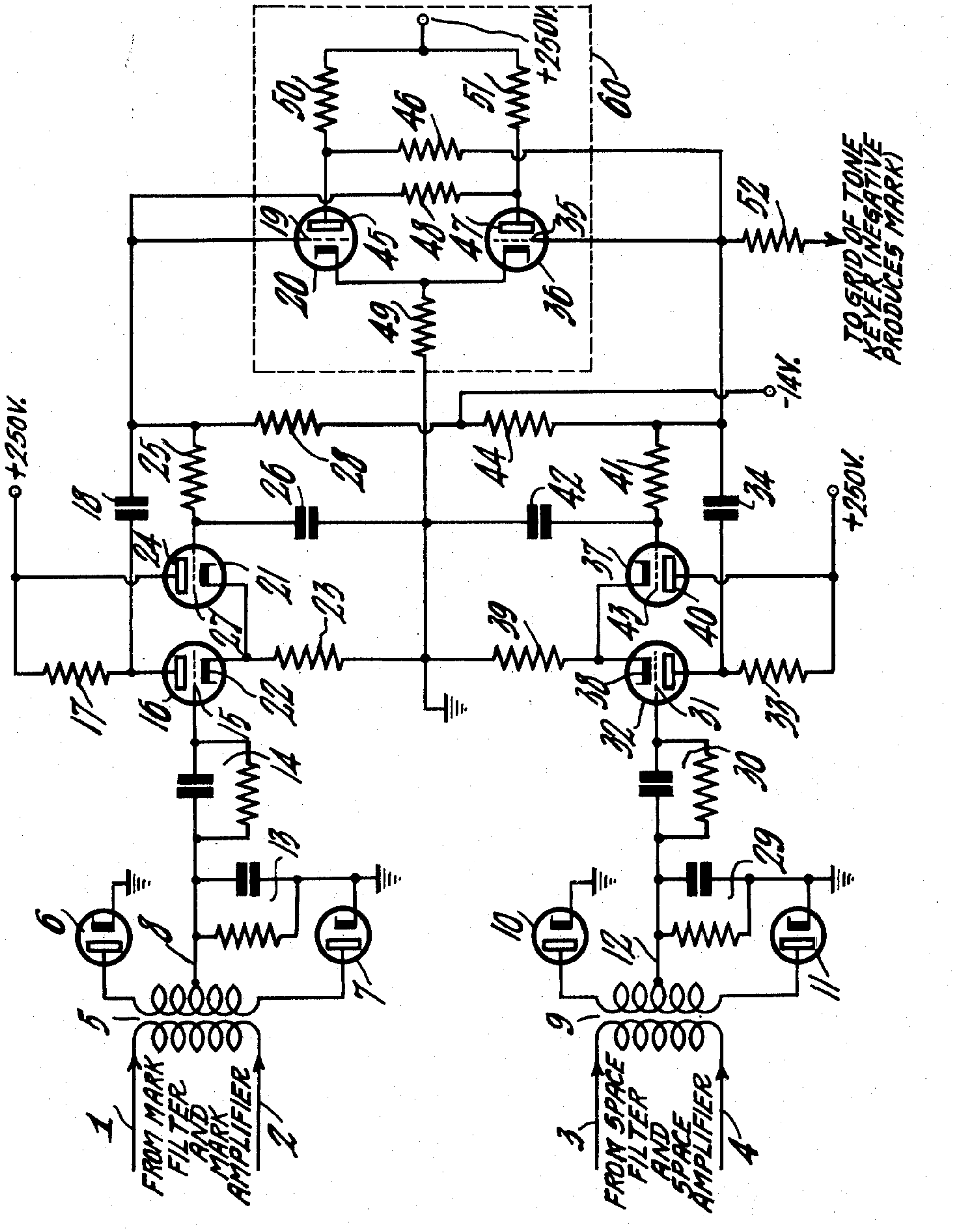
INVENTOR
John B. Atwood
BY
Charles H. Brown
ATTORNEY Patented Oct. 6, 1953 2,654,801

UNITED STATES PATENT OFFICE 2,654,801

FREQUENCY SHIFT RECEIVER

John B. Atwood, Riverhead, N. Y., assignor to Radio Corporation of America, a corporation of Delaware Application October 20, 1951, Serial No. 252,384

14 Claims. (Cl. 178—66)

This invention relates to a receiver for receiving frequency shift radio telegraph signals, and more particularly to such a receiver which provides improved reception of frequency shift signals in the presence of multipath transmission signals being received from a remote transmitter.

Frequency shift signals comprise marking characters represented by current of one frequency and spacing characters represented by current of another frequency. These two frequencies may be separated from each other by several hundred cycles. The signals also have characteristics of on-off telegraphy since they are alternatively present.

In certain type of receivers for such frequency shift signals, separate channels are provided (by means of respective tuned filters) for the mark and space frequencies and a relay or trigger circuit is connected to the outputs of these channels somewhat differentially, in such manner that the relay will be thrown one way for spacing signals and the opposite way for marking signals.

In long distance radio communication via the ionosphere it has been found that waves from the transmitting antenna are picked up by the receiving antenna after travelling over paths of different length. This is known as multipath transmission. It is not uncommon, because of this, for waves over the shortest and longest significant paths, which have left the transmitter at the same time, to arrive at the receiver at times which differ by as much as several milliseconds. For example, assume that a signal over one such path arrives at the receiver two milliseconds later than the signal over another path. Both of these path signals are present in the receiver, one or the other being the stronger depending upon momentary conditions of the transmission paths. Because of this time difference, the later received signal will in effect change from mark to space frequency, and vice versa, two milliseconds later than the earlier received signal. Therefore, during this two millisecond interval, both mark and space frequencies are present simultaneously in the receiver.

When both frequencies are present simultaneously in a frequency shift receiver of the type above described, which occurs at the trailing edges of the mark and space characters, the receiver output relay will not reproduce the correct lengths of keying characters as transmitted, since it will hold over too long on one side or the other.

An object of this invention is to devise a novel receiver for frequency shift signals in which the effects of multipath transmission on the recorded signal are substantially eliminated.

Another object is to provide a radio receiver for frequency shift signals in which separate channels are utilized for mark and space frequencies and in which the deleterious effects of multipath transmission on the recorded signal are substantially entirely eliminated.

The foregoing and other objects of the invention will be best understood from the following description of an exemplification thereof, reference being had to the accompanying drawing, wherein the single figure is a schematic representation of a circuit according to this invention.

The present invention is based on the logical assumption that the leading edge of each mark or space character arrives at the receiver with correct timing and that it is the trailing edge of each character which is elongated by the multipath transmission.

Briefly, the objects of this invention are accomplished in the following manner: A bistable or balanced trigger circuit or locking circuit, whose output controls a utilization device, has its input coupled to a pair of gating tubes (in turn respectively supplied with the outputs of the mark and space channels) in such a way that the leading edge of the mark (or space) character trips the trigger circuit and the output of the space (or mark) channel is disconnected from the trigger circuit until the multipath (overlapping of mark and space characters) has cleared. Thereafter, the circuit puts itself in such a condition that the leading edge of the space (or mark) character will reverse the operation, tripping the trigger circuit the other way.

Referring to the drawing, there is shown only a portion of the receiver for frequency shift signals with which the circuit of this invention may be used. The receiver includes a first output circuit from the mark amplifier, comprising leads 1 and 2, and a second output circuit from the space amplifier comprising leads 3 and 4. These two output circuits of the receiver may be considered as separate channels for the mark and space frequencies, the frequencies being separated by differently-tuned mark and space filters which feed the respective mark and space amplifiers. The circuit of the invention includes a bistable locking or trigger circuit 60 shown within the dotted-line box. The output of the trigger circuit 60 is connected to a utilization device, herein designated tone keyer, via resistor 52. One input of the trigger circuit 60 is coupled to the mark channel of the receiver over a path which includes a gate circuit 16, 21, a full-wave rectifier 6, 7 and a transformer 5. The other input of the trigger circuit 60 is coupled to the space channel of the receiver over a path which includes a gate circuit 32, 37, a full-wave rectifier 10, 11 and a transformer 9. One full-wave rectifier comprises diodes 6 and 7. The other full-wave rectifier comprises diodes 10 and 11. Obviously, any suitable rectifiers may be used instead of the vacuum tube diodes shown.

By means of transformer 5, the ends of the secondary of which are coupled to the anodes of respective diodes 6 and 7, the output of the mark amplifier (which may be of intermediate frequency pulsating in accordance with the keying) is rectified in full-wave manner to produce a negative voltage on the lead 8 (connected to the midpoint of the secondary of transformer 5) in response to the appearance of marking characters. By means of transformer 9, the ends of the secondary of which are coupled to the anodes of respective diodes 10 and 11, the output of the space amplifier (which may be of intermediate frequency pulsating in accordance with the keying) is rectified in full-wave manner to produce a negative voltage on the lead 12 (connected to the midpoint of the secondary of transformer 9) in response to the appearance of spacing characters.

Instead of a single receiver for the frequency shift signals, a frequency shift keying (FSK) diversity receiver may be used, such as that disclosed in the copending Trevor application, Serial No. 106,465, filed July 23, 1949, which application ripened on November 25, 1952, into Patent No. 2,619,587. In this latter event, a plurality of mark amplifiers, one for each diversity receiver, are fed from respective mark filters, one for each diversity receiver, while an equal number of space amplifiers, one for each diversity receiver, are fed from respective space filters, one for each diversity receiver. In this latter event, a plurality of rectifying arrangements similar to elements 5, 6 and 7 would be provided for the mark amplifiers, with the midpoints of the secondaries of all the mark transformers (corresponding to 5) connected to lead 8. Also, a plurality of rectifying arrangements similar to elements 9, 10 and 11 would be provided for the space amplifiers, with the midpoints of the secondaries of all the space transformers (corresponding to 9) connected to lead 12.

The negative voltage appearing on lead 8 in response to a marking character is filtered by a filter network 13 and coupled by means of a coupling network 14 to the grid 15 of a triode electrode structure 16, which may be one-half of a type 6SL7 vacuum tube. Structure 16 may be thought of as an electron discharge gating device. The anode of tube 16 is connected through a load resistor 17 to the positive terminal of a source of unidirectional potential, of 250 volts, for example, and voltage is taken from across this resistor through a coupling capacitor 18 and applied to the grid 19 of a triode electrode structure 20, which may be one-half of a type 6SL7 vacuum tube.

A control triode electrode structure or electron discharge device 21, which may be the other half of the tube of which structure 16 forms one half, has its cathode connected to the cathode 22 of structure 16, and these two cathodes are connected through a common cathode resistor 23 to ground. The anode 24 of structure 21 is connected directly to the positive 250-volt terminal. By these connections, the flow of current in tube 21 is made to produce a voltage drop across cathode resistor 23, this voltage drop being utilized as a biasing voltage in the grid-cathode circuit of tube 16, thus controlling the state of conduction in tube 16.

A resistor 25 and a capacitor 26 are connected in series in that order between grid 19 and ground, and the junction point of elements 25 and 26 is connected to grid 27 of structure 21. Negative bias is provided on grids 19 and 27 through a resistor 28 one end of which is connected to a potential point of minus 14 volts on the unidirectional source and the other end of which is connected to the junction point of elements 25 and 19.

The negative voltage appearing on lead 12 in response to a spacing character is filtered by a filter network 29 and coupled by means of a coupling network 30 to the grid 31 of a triode electrode structure 32, which may be one-half of a type 6SL7 vacuum tube. Structure 32 may be termed an electron discharge gating device. The anode of tube 32 is connected through a load resistor 33 to the positive terminal of a source of unidirectional potential, of 250 volts, for example, and voltage is taken from across this resistor through a coupling capacitor 34 and applied to the grid 35 of a triode electrode structure 36, which may be the other half of the tube of which structure 20 forms one half.

A control triode electrode structure or electron discharge device 37, which may be the other half of the tube of which structure 32 forms one half, has its cathode connected to the cathode 38 of structure 32, and these two cathodes are connected through a common cathode resistor 39 to ground. The anode 40 of structure 37 is connected directly to the positive 250-volt terminal. By these connections, the flow of current in tube 37 is made to produce a voltage drop across cathode resistor 39, this voltage drop being utilized as a biasing voltage in the grid-cathode circuit of tube 32, thus controlling the state of conduction in tube 32.

A resistor 41 and a capacitor 42 are connected in series in that order between grid 35 and ground, and the junction point of elements 41 and 42 is connected to grid 43 of structure 37. Negative bias is provided on grids 35 and 43 through a resistor 44 one end of which is connected to a potential point of minus 14 volts on the unidirectional source and the other end of which is connected to the junction point of elements 41 and 35.

Electrode structures 20 and 36 are arranged in a bistable locking or trigger circuit, that is, one having two conditions of electrical stability. In this locking circuit the anode 45 of tube 20 is coupled to the grid 35 of tube 36 by a resistor 46, while the anode 47 of tube 36 is coupled to the grid 19 of tube 20 by a resistor 48. The cathodes of the tubes 20 and 36 are connected to ground by the common resistor 49. Anode 45 is connected to the positive source of potential of 250 volts through a resistor 50, while anode 47 is connected to this same positive source through a resistor 51.

The locking circuit or trigger circuit described, including tubes 20 and 36, is quite similar to that disclosed in the expired Finch Patent #1,844,950. In general, it may be stated that when current is caused to flow in tube 20 a tripping or switching or triggering action takes place to cut off the current in tube 36. When for some reason current flow is initiated in tube 36 the reverse operation takes place to cut off the tube 20. The electrode structures 20 and 36 are intercoupled by the connections described and are alternatively conductive because when the anode potential of one thereof drops because of current flow therein the grid of the other thereof becomes more negative to cut off current in the other tube. Thus, this arrangement constitutes a locking circuit having two conditions of electrical stability, in which the flow of current in one electrode structure causes a cessation of current in the other electrode structure, and vice versa.

Grid 35 of tube 36 is connected to the grid of a suitable tone keyer through an isolating resistor 52, so that voltage changes on grid 35 are applied to the tone keyer grid. The tone keyer grid is operated from about zero to a negative potential, negative potential on this grid representing mark status and zero representing space status.

The operation of the circuit of this invention will now be described. Starting at a given instant of time, assume that tube 16 is conducting and tube 21 is cut off, tube 32 being cut off and tube 37 conducting. How this is brought about will become apparent hereinafter. The leading edge of the mark character results in the production of a negative voltage on lead 8, which voltage is applied to grid 15 of tube 16 to make this grid go negative. This decreases the anode current in tube 16, causing the voltage at the anode of said tube to go in a positive direction, the resulting positive pulse being fed through capacitor 18 to the grid 19 of tube 20. As previously stated, tubes 20 and 36 and their associated resistors comprise a trigger circuit or locking circuit.

The positive pulse applied to grid 19 of tube 20 trips the locking circuit so that tube 20 is conducting and tube 36 is cut-off or non-conducting. The voltage at anode 45 may vary, for example, from plus 140 volts when tube 20 is non-conducting to plus 50 volts when this tube is conducting. Tube 20 now being conducting, the flow of anode current through resistor 50 causes a large voltage drop thereacross, so that the grid 35 of tube 36 is now negative with respect to ground (it may be seen that grid 35 is connected to an intermediate point on a voltage divider network consisting of resistors 50, 46 and 44 connected between plus 250 volts and minus 14 volts). Since grid 35 is connected to the tone keyer grid through isolating resistor 52 and since grid 35 is at this time negative with respect to ground, the tone keyer is then on mark status and produces a tone output for mark.

Once the trigger circuit has been tripped to mark condition (tube 20 conducting and tube 36 cut off) by the leading edge of the mark signal, the mark input circuit to the trigger circuit should be disconnected or gated closed and the space input circuit should be connected or gated open, so as to receive the following space signal. However, this should not be done immediately because there is an elongated trailing edge due to multipath transmission on the previous space signal, which means that the space signal may be still present. If the input circuit transfer took place at once the multipath on the trailing edge of the previous space signal would produce another and false operation of the trigger circuit or locking circuit. Hence, a delay must be introduced which is as long as possible to allow for multipath elongation of the preceding space signal and yet short enough to allow the input circuit transfer to take place before the following space signal or character arrives. When tube 20 conducts (in response to the leading edge of the mark signal) its grid 19 is maintained at a positive potential with respect to ground (the voltage of approximately 140 volts obtaining at anode 47 when tube 36 is cut off being then applied to one end of the series voltage divider 48, 28 and grid 19 being connected to an intermediate point on this divider the opposite end of which is connected to minus 14 volts) and this positive potential is applied to the grid 27 of tube 21 through the time delay circuit consisting of resistor 25 and capacitor 26. After a predetermined time delay or time interval determined by the constants of this time delay circuit, tube 21 is caused to conduct by the positive potential thus applied to its grid 27. When tube 21 is cut off and tube 16 is conducting, the potential of cathode 22 and of the cathode of tube 21 is approximately plus 2.0 volts; when tube 21 is caused to conduct in the manner described, the flow of current through common cathode resistor 23 raises the potential of cathode 22 to approximately plus 6.5 volts, thus biasing off or cutting off tube 16. Since a negative voltage appears on lead 8 in response to mark, the application of this voltage to tube 16 (which is now cut off) produces no effect on this tube; the mark input circuit is thus disconnected or gated off from the trigger circuit.

The cathodes of the tubes 20 and 36 are connected together and remain at a potential of approximately plus 4 volts as current is switched from one to the other of these tubes. When tube 36 is stripped to the non-conducting condition (in response to the leading edge of the mark signal) its grid 35 is brought to a negative potential with respect to ground (the voltage of approximately 50 volts obtaining at anode 45 when tube 20 conducts being then applied to one end of the series voltage divider 46, 44 and grid 35 being connected to an intermediate point on this divider the opposite end of which is connected to minus 14 volts) and this negative potential is applied to the grid 43 of tube 37 through the time delay circuit consisting of resistor 41 and capacitor 42. After a predetermined time delay or time interval determined by the constants of this time delay circuit, tube 37 is cut off by the negative potential thus applied to its grid 43. When tube 37 is cut off the potential of cathode 38 and of the cathode of tube 37 is approximately plus 2.0 volts; this cathode potential is insufficient to bias off tube 32 and hence tube 32 is caused to conduct, in readiness for the next space character.

When the space character leading edge arrives, a negative voltage is produced on lead 12, which voltage is applied to grid 31 of tube 32 to make this grid go negative. This decreases the anode current in tube 32, causing the voltage at the anode of said tube to go in a positive direction, the resulting positive pulse being fed through capacitor 34 to the grid 35 of tube 36.

The positive pulse applied to grid 35 trips the locking circuit so that tube 36 is conducting and tube 20 is cut off or non-conducting. Tube 20 now being cut off, the voltage at anode 45 thereof rises to approximately plus 140 volts and the potential of grid 35 rises to zero or goes positive from its former negative value, since it is coupled to anode 45 through a voltage dividing network including resistor 46. Since grid 35 now has a zero or positive potential, the tone keyer is then on space status and produces zero tone output for space.

Once the trigger circuit has been tripped to space condition (tube 36 conducting and tube 20 cut off) by the leading edge of the space signal, the space input circuit to the trigger circuit should be disconnected or gated closed and the mark input circuit should be gated open, so as to receive the following mark signal. However, this should not be done immediately because there is an elongated trailing edge due to multipath transmission on the previous mark signal, which means that the mark signal may be still present. If the input circuit transfer took place at once the multipath on the trailing edge of the previous mark signal would produce another and false operation of the trigger circuit or locking circuit. A delay is therefore introduced which is as long as possible to allow for multipath elongation of the preceding mark signal and yet short enough to allow the input circuit transfer to take place before the following mark signal or character arrives. When tube 36 conducts in response to the leading edge of the space signal its grid 35 is maintained at a positive potential with respect to ground (the voltage of approximately 140 volts obtaining at anode 45 when tube 20 is cut off being then applied to one end of the series voltage divider 46, 44 and grid 35 being connected to an intermediate point on this divider the opposite end of which is connected to minus 14 volts) and this positive potential is applied to the grid 43 of tube 37 through the time delay circuit 41, 42. Tube 37 is thus caused to conduct after a predetermined time delay or time interval determined by the constants of circuit 41, 42, raising the potential of cathode 38 to approximately plus 6.5 volts, cutting off or biasing off tube 32. Since a negative voltage appears on lead 12 in response to space, the application of this voltage to tube 32 (now cut off) produces no effect on this tube; the space input circuit is thus disconnected or gated off from the trigger circuit.

When tube 20 is tripped to the non-conducting condition (at the leading edge of the space signal) its grid 19 is brought to a negative potential with respect to ground (the voltage of approximately 50 volts obtaining at anode 47 when tube 36 conducts being then applied to one end of the series voltage divider 48, 28 and grid 19 being connected to an intermediate point on this divider the opposite end of which is connected to minus 14 volts) and this negative potential is applied to the grid 27 of tube 21 through the time delay circuit 25, 26. Tube 21 is thus cut off after a predetermined time delay or time interval determined by the constants of circuit 25, 26, lowering the potential of cathode 22 to approximately plus 2.0 volts; this cathode potential is insufficient to bias off tube 16 and hence tube 16 is caused to conduct, in readiness for the next mark character.

Since the description of operation of the circuit started off with the assumption that tube 16 is conducting and tube 21 cut off, tube 32 being cut off and tube 37 conducting, the description of the circuit operation is now completed.

The following values of some circuit components are given merely by way of example and not by way of limitation. These were the values used in a circuit according to this invention which was built and successfully tested.

| | | |
|---|---|---|
| Resistor **17** | ohms | 120,000 |
| Resistor **23** | do | 2,700 |
| Resistor **25** | megohm | 1 |
| Resistor **28** | ohms | 27,000 |
| Resistor **33** | do | 120,000 |
| Resistor **39** | do | 2,700 |
| Resistor **41** | megohm | 1 |
| Resistor **44** | ohms | 27,000 |
| Resistor **46** | ohms | 150,000 |
| Resistor **48** | do | 150,000 |
| Resistor **49** | do | 2,200 |
| Resistor **50** | do | 100,000 |
| Resistor **51** | do | 100,000 |
| Resistor **52** | megohm | 1 |
| Capacitor **18** | mfd | .005 |
| Capacitor **26** | mmfd | 500 |
| Capacitor **34** | mfd | .005 |
| Capacitor **42** | mmfd | 500 |

What is claimed is:

1. In a receiver for frequency shift telegraph signals with means for separately detecting the mark and space signals, a locking circuit having two conditions of electrical stability and comprising a pair of intercoupled electrode structures, so arranged that the flow of current in one structure causes a cessation of current in the other structure, and vice versa, means for applying one detected signal to said locking circuit to cause current flow in one structure, thereby tripping said locking circuit to one condition, a controllable circuit for applying the other detected signal to said locking circuit to trip the same to its other condition, and circuit controlling means responsive to the flow of current in said one structure for effectively closing said controllable circuit at the end of a predetermined time interval beginning with the tripping of said locking circuit to said one condition.

2. In a receiver for frequency shift telegraph signals with means for separately detecting the mark and space signals, a locking circuit having two conditions of electrical stability and comprising a pair of intercoupled electrode structures, so arranged that the flow of current in one structure causes a cessation of current in the other structure, and vice versa, a controllable circuit for applying one detected signal to said locking circuit to cause current flow in one structure and a cessation of current flow in the other structure, thereby tripping said locking circuit to one condition, circuit controlling means responsive to the cessation of current flow in said other structure for effectively opening said controllable circuit at the end of a predetermined time interval beginning with the tripping of said locking circuit to said one condition, and means for applying the other detected signal to said locking circuit to trip the same to its other condition.

3. In a receiver for frequency shift telegraph signals with means for separately detecting the mark and space signals, a locking circuit having two conditions of electrical stability and comprising a pair of intercoupled electrode structures, so arranged that the flow of current in one structure causes a cessation of current in the other structure, and vice versa, a controllable circuit for applying one detected signal to said locking circuit to cause current flow in one structure and a cessation of current flow in the other structure, thereby tripping said locking circuit to one condition, circuit controlling means responsive to the cessation of current flow in said other structure for effecting control of said controllable circuit at the end of a first predetermined time interval beginning with the tripping of said locking circuit to said one condition, a controllable circuit for applying the other detected signal to said locking circuit to trip the same to its other condition, and circuit controlling means responsive to the flow of current in said one structure for effecting control of said last-named controllable circuit at the end of a second predetermined time interval beginning with the tripping of said locking circuit to said one condition.

4. A receiver in accordance with claim 3, wherein the first-named controllable circuit is effectively opened at the end of the first time interval.

5. A receiver in accordance with claim 3, wherein the last-named controllable circuit is effectively closed at the end of the second time interval.

6. A receiver in accordance with claim 3, wherein the first-named controllable circuit is effectively opened at the end of the first time interval, wherein the last-named controllable circuit is effectively closed at the end of the second time interval, and wherein the first and second time intervals are approximately equal.

7. In a receiver for frequency shift telegraph signals with means for separately detecting the mark and space signals, a locking circuit having two conditions of electrical stability and comprising a pair of intercoupled electrode structures, so arranged that the flow of current in one structure causes a cessation of current in the other structure, and vice versa, means for applying one detected signal to said locking circuit to cause current flow in one structure, thereby tripping said locking circuit to one condition, a circuit including an electron discharge gating device for applying the other detected signal to said locking circuit to trip the same to its other condition, and control means responsive to the flow of current in one said structure for opening said gating device at the end of a predetermined time interval beginning with the tripping of said locking circuit to said one condition.

8. A receiver in accordance with claim 7, wherein the control means comprises an electron discharge device coupled to said one structure and the flow of current through which varies the bias on said gating device.

9. In a receiver for frequency shift telegraph signals with means for separately detecting the mark and space signals, a locking circuit having two conditions of electrical stability and comprising a pair of intercoupled electrode structures, so arranged that the flow of current in one structure causes a cessation of current in the other structure, and vice versa, a circuit including an electron discharge gating device for applying one detected signal to said locking circuit to cause current flow in one structure and a cessation of current flow in the other structure, thereby tripping said locking circuit to one condition, control means responsive to the cessation of current flow in said other structure for closing said gating device at the end of a predetermined time interval beginning with the tripping of said locking circuit to said one condition, and means for applying the other detected signal to said locking circuit to trip the same to its other condition.

10. A receiver in accordance with claim 9, wherein the control means comprises an electron discharge device coupled to said other structure and the flow of current through which varies the bias on said gating device.

11. In a receiver for frequency shift telegraph signals with means for separately detecting the mark and space signals, a locking circuit having two conditions of electrical stability and comprising a pair of intercoupled electrode structures, so arranged that the flow of current in one structure causes a cessation of current in the other structure, and vice versa, a circuit including an electron discharge gating device for applying one detected signal to said locking circuit to cause current flow in one structure and a cessation of current flow in the other structure, thereby tripping said locking circuit to one condition, control means responsive to the cessation of current flow in said other structure for closing said gating device at the end of a first predetermined time interval beginning with the tripping of said lock ingcircuit to said one condition, a circuit including an electron discharge gating device for applying the other detected signal to said locking circuit to trip the same to its other condition, and control means responsive to the flow of current in said one structure for opening said last-named gating device at the end of a second predetermined time interval beginning with the tripping of said locking circuit to said one condition.

12. A receiver in accordance with claim 11, wherein the first-named control means comprises an electron discharge device coupled to said other structure and the flow of current through which varies the bias on the first-named gating device.

13. A receiver in accordance with claim 11, wherein the last-named control means comprises an electron discharge device coupled to said one structure and the flow of current through which varies the bias on the last-named gating device.

14. A receiver in accordance with claim 11, wherein the first-named control means comprises an electron discharge device coupled to said other structure and the flow of current through which varies the bias on the first-named gating device, wherein the last-named control means comprises an electron discharge device coupled to said one structure and the flow of current through which varies the bias on the last-named gating device, and wherein the first and second time intervals are approximately equal.

JOHN B. ATWOOD.

References Cited in the file of this patent

UNITED STATES PATENTS

| Number | Name | Date |
|---|---|---|
| 2,075,604 | Finch | Mar. 30, 1937 |
| 2,086,918 | Luck | July 13, 1937 |
| 2,118,156 | Burton | May 24, 1938 |

FOREIGN PATENTS

| Number | Country | Date |
|---|---|---|
| 516,099 | Germany | Jan. 17, 1931 |